United States Patent
Salkintzis

(10) Patent No.: US 9,591,531 B2
(45) Date of Patent: Mar. 7, 2017

(54) METHODS AND AN APPARATUS FOR TRANSFERRING DATA COMMUNICATION SESSIONS BETWEEN RADIO-ACCESS NETWORKS

(71) Applicant: Google Technology Holdings LLC, Mountain View, CA (US)

(72) Inventor: Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 132 days.

(21) Appl. No.: 14/320,697

(22) Filed: Jul. 1, 2014

(65) Prior Publication Data
US 2016/0007238 A1 Jan. 7, 2016

(51) Int. Cl.
| | |
|---|---|
| H04L 12/859 | (2013.01) |
| H04W 36/00 | (2009.01) |
| H04L 29/08 | (2006.01) |
| H04W 28/02 | (2009.01) |
| H04W 36/30 | (2009.01) |
| H04W 88/16 | (2009.01) |

(52) U.S. Cl.
CPC ..... *H04W 36/0022* (2013.01); *H04L 47/2475* (2013.01); *H04L 67/2814* (2013.01); *H04W 28/0247* (2013.01); *H04W 36/30* (2013.01); *H04W 88/16* (2013.01)

(58) Field of Classification Search
CPC ..... H04W 36/30; H04W 36/18; H04W 36/14; H04W 36/12; H04W 36/08
See application file for complete search history.

(56) References Cited

U.S. PATENT DOCUMENTS

| 8,331,315 B2 | 12/2012 | Purkayastha et al. |
| 2011/0058479 A1 | 3/2011 | Chowdhury |
| 2012/0084460 A1* | 4/2012 | McGinnity ........... H04L 67/327 709/242 |
| 2012/0088516 A1* | 4/2012 | Ji ........................ H04L 1/0027 455/452.1 |

(Continued)

FOREIGN PATENT DOCUMENTS

| CN | EP 2900011 A1 * | 7/2015 | ......... H04L 67/2842 |
| KR | 10-2013-0044536 A | 5/2013 | |
| WO | 2013/055649 A1 | 4/2013 | |

OTHER PUBLICATIONS

European Patent Office, International Search Report and Written Opinion for PCT Application No. PCT/US2015/038336, mailed Oct. 9, 2015.

*Primary Examiner* — Kashif Siddiqui
(74) *Attorney, Agent, or Firm* — Faegre Baker Daniels LLP

(57) ABSTRACT

The disclosure is directed to a method carried out on a wireless device capable of communicating over a first radio-access network ("RAN") using a first radio-access technology ("RAT") and over a second RAN using a second RAT. According to various implementations, the device proxies a data communication session between an application executing on the device and a remote host over the first RAN, requests data content from the remote host during the session, transfers the session from the first RAN to a second RAN based on the amount of the data content that remains to be received from the remote host during the session and based on a radio-access condition of the first RAN or of the second RAN.

17 Claims, 7 Drawing Sheets

(56) References Cited

U.S. PATENT DOCUMENTS

| | | | |
|---|---|---|---|
| 2013/0229270 A1 | 9/2013 | Srinivasan et al. | |
| 2014/0052838 A1* | 2/2014 | Giacomoni | H04L 41/00 709/223 |
| 2014/0241322 A1 | 8/2014 | Kim et al. | |
| 2015/0009956 A1* | 1/2015 | Kweon | H04L 69/16 370/331 |
| 2015/0092553 A1* | 4/2015 | Sirotkin | H04W 28/08 370/235 |
| 2015/0098393 A1* | 4/2015 | Tofighbakhsh | H04W 24/02 370/329 |
| 2015/0271698 A1* | 9/2015 | Dalsgaard | H04L 5/0051 370/235 |
| 2015/0296418 A1* | 10/2015 | Szilagyi | H04W 36/0016 370/331 |

\* cited by examiner

METHODS AND AN APPARATUS FOR TRANSFERRING DATA COMMUNICATION SESSIONS BETWEEN RADIO-ACCESS NETWORKS

TECHNICAL FIELD

The present disclosure relates generally to wireless network communication and, more particularly, to methods and an apparatus for transferring data communication sessions between radio-access networks.

BACKGROUND

There have been considerable efforts on the part of mobile operators to find ways to offload data traffic from their cellular networks to wireless local area networks ("WLANs"). One of the challenges in doing so involves carrying such a transfer during an active data session. For example, while both the WLAN and the cellular interfaces are active for data communication in a device, if the Internet protocol ("IP") routing rules on a wireless device change during a YOUTUBE® video streaming session over WLAN such that the YOUTUBE® traffic is re-routed to the cellular interface, then the video playback stops. After re-routing, the device continues receiving video content over WLAN but sends transport control protocol ("TCP") acknowledge messages ("ACKs") over the cellular interface, which are dropped by the remote YOUTUBE® host. Once the TCP send window closes, the remote host stops sending data to the device. The YOUTUBE® client is not aware of the re-routing and does not take any measures to avoid this. From its point of view, it sent duplicate ACKs to the remote host but suddenly stopped receiving new data.

In short, when the IP-routing rules in a wireless device redirect an application's traffic to a different IP interface, while the previously used IP interface remains active in the wireless device, the application does not detect this change and does not react to avoid the communication interruption. This poses challenges to efforts to offload cellular traffic to WLAN networks.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
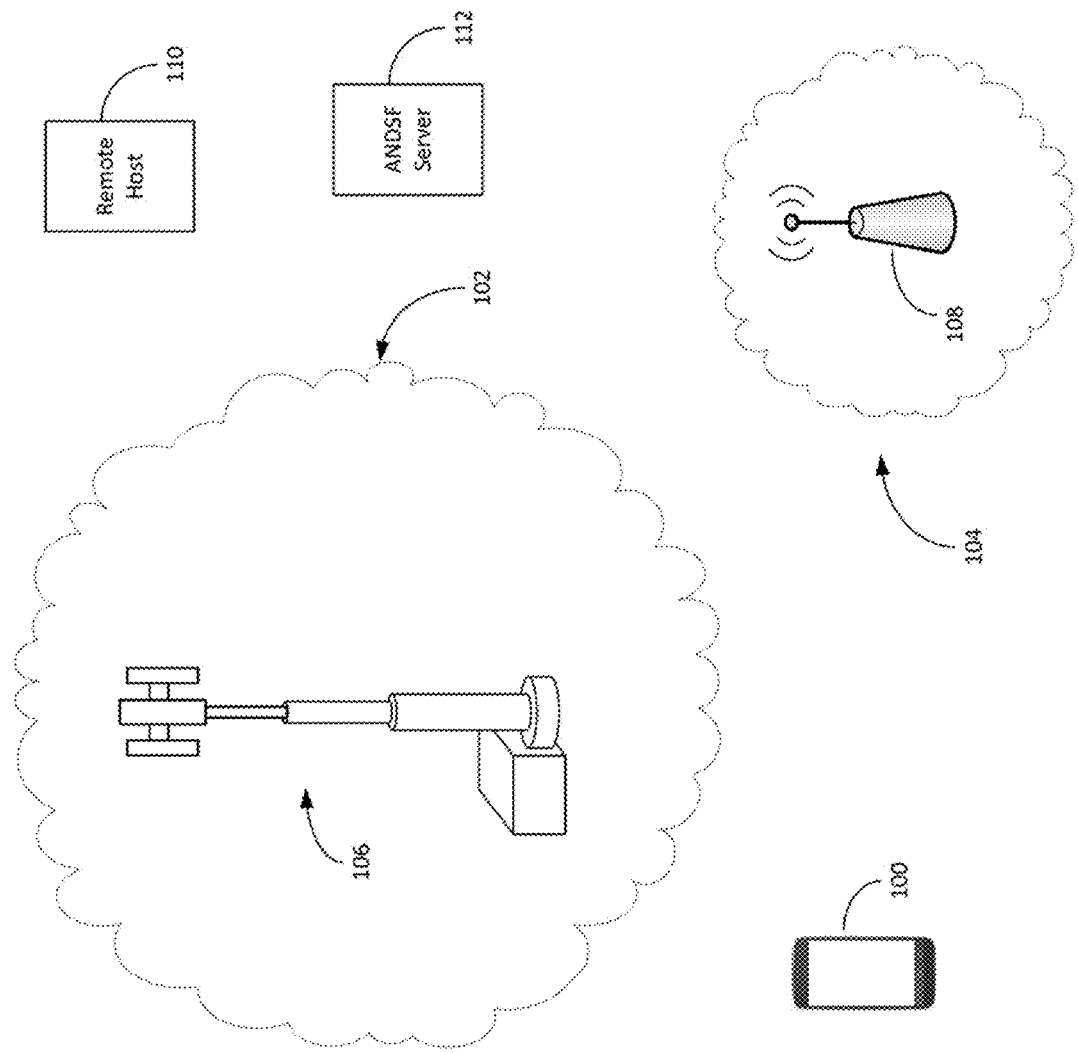
FIG. 1 is a block diagram of a communication system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure describes a method carried out on a wireless device ("the device") capable of communicating over a first radio-access network ("RAN") using a first RAT and over a second RAN using a second RAT. According to various embodiments, the device proxies a data communication session ("the session") between an application executing on the device and a remote host over the first RAN, requests data content from the remote host during the session, transfers the session from the first RAN to a second RAN based on the amount of the data content that remains to be received from the remote host during the session and based on a radio-access condition of the first RAN or of the second RAN.

Turning to FIG. 1, in an embodiment, a wireless device 100 is configured to communicate over a first RAN 102 and a second RAN 104. The first RAN 102 includes a base station 106. The base station 106 is one of many base stations of first RAN 102. The base station 106 is connected to other parts of the first RAN 102 by one or more well known mechanisms. Possible implementations of the base station 106 include an enhanced Node B. The device 100 communicates over the first RAN 102 by way of the base station 106 using a first RAT. The second RAN 104 includes a wireless access point 108. The device 100 communicates over the second RAN 104 by way of the access point 108 using a second RAT. Possible implementations of the first RAT include a Third Generation Partnership Project ("3GPP") technology, such as Long-Term Evolution or other cellular communication technology. Possible implementations of the second RAT include a WLAN RAT, such as one of the Institute of Electrical and Electronics Engineers ("IEEE") 802.11 family of communication technologies. Possible implementations of the device 100 include a cellphone (e.g., a smartphone), a tablet computer, a notebook computer, and a wearable device (e.g., a smartwatch). Also shown in FIG. 1 are a remote host 110 and an access network discovery and selection function ("ANDSF") server 112, which are discussed below in further detail.

Figure 2:
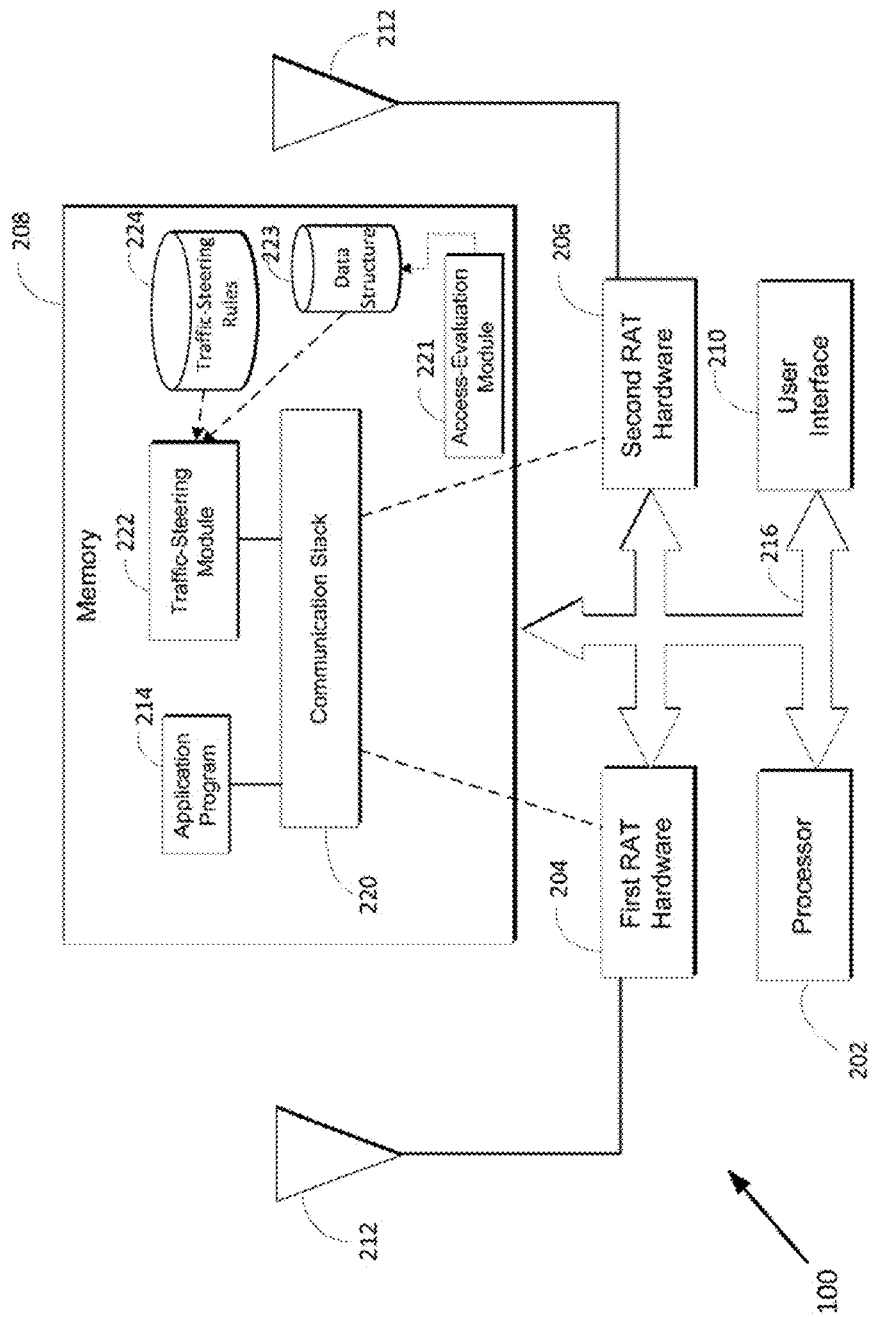
FIG. 2 is a block diagram of a representative wireless device.

Turning to FIG. 2, a possible implementation of the device 100 includes a processor 202, first RAT hardware 204 (e.g., a baseband chipset that includes a transceiver capable of communicating by radio according to a 3GPP standard), and second RAT hardware 206 (e.g., a WLAN chipset that includes a transceiver capable of communicating by radio according to one or more of the IEEE 802.11 family of standards). The device 100 further includes memory 208, a user interface 210 (e.g., a touchscreen), and antennas 212. The memory 208 can be implemented as volatile memory, non-volatile memory, or a combination thereof. The memory 208 may be implemented in multiple physical locations and across multiple types of media (e.g., dynamic random-access memory plus a hard disk drive). The processor 202 retrieves instructions from the memory 208 and operates according to those instructions to carry out various functions, including providing outgoing data to and receive incoming data from the first RAT hardware 204 and the second RAT hardware 206. Among the possible instructions that the processor 202 carries out include those of an application program 214, a communication stack 220 (e.g., a TCP and IP stack), an access-evaluation module 221, and a traffic-steering module 222. Thus, when this disclosure refers to the application program 214, the communication stack 220, the access-evaluation module 221, or the traffic-steering module 222 carrying out an action, it is, in many embodiments, the processor 202 that actually carries out the action (in coordination with other pieces of hardware of the device 100 as necessary).

Each of the elements of the device 100 is communicatively linked to the other elements via data pathways 216. Possible implementations of the data pathways 216 include wires, conductive pathways on a microchip, and wireless connections. Possible implementations of the processor 202 include a microprocessor, a microcontroller, and a digital signal processor.

Continuing with FIG. 2, the processor 202 also executes instructions of an access-evaluation module 221. The access-evaluation module 221 determines one or more radio-access conditions, either by measuring the radio-access condition or by receiving information regarding the radio-access condition from an external source. The access-evaluation module 221 also obtains threshold values for the radio-access conditions.

Examples of radio-access conditions include the reference-signal receive power ("RSRP"), reference-signal received quality ("RSRQ"), WLAN Basic Service Set ("BSS") load, WLAN backhaul rate, TCP throughput, and the offload preference of the RAN. There are many possible ways that the device 100 can obtain the radio-access conditions. Examples include: (1) The base station 106 transmits a reference signal, which the device 100 measures in order to determine the RSRP and RSRQ. (2) The device 100 receives the BSS load from the access point 108 (which broadcasts this information) and averages this load across a predefined time period. (3) The device 100 intermittently sends IEEE 802.11u access network query protocol messages to the second RAN 104 to determine the available backhaul downlink and uplink rate of the second RAN 104. (4) The device 100 performs its own access-evaluation procedures to determine additional characteristics (such as the TCP throughput) of the first RAN 102 or the second RAN 104. (5) The base station 106 transmits an Offload Preference Indicator ("OPI") which the device 100 uses to determine the offload preference of the first RAN 102.

Examples of threshold values include low RSRP threshold, high RSRP threshold, low RSRQ threshold, high RSRQ threshold, high BSS load threshold, low downlink backhaul rate, and low uplink backhaul rate. In some embodiments, the device 100 obtains these threshold values from the first RAN 102 (e.g., from the base station 106 or from a radio network controller (not shown)) via radio resource control signaling. In other embodiments, the device 100 obtains these values from the second RAN 104. In still other embodiments, the device 100 obtains these values from the ANDSF server 112. The access-evaluation module 221 stores the radio-access conditions (when measured or received) and the threshold values in a data structure 223.

Continuing with FIG. 2, the processor 202 executes instructions of a traffic-steering module 222. The traffic-steering module 222 behaves as a transparent TCP proxy that carries out a proxy function internally to the wireless device 100. The traffic-steering module 222 configures the communication stack 220 according to a set of traffic-steering rules 224. The traffic-steering rules 224 rely partly on the radio-access conditions and the threshold values stored in the data structure 223. A traffic-steering rule is considered to be "valid" if the conditions of the rule are satisfied. A data communication session "matches" a traffic-steering rule if the conditions for that session match those set forth in the rule.

The traffic-steering rules 224 indicate which RAN is the most preferred for routing particular data communication sessions (e.g., routing particular IP flows). Examples of possible traffic-steering rules include: (1) If the measured RSRP is less than the low RSRP threshold received from the base station, then route communication sessions of a YOUTUBE® application on WLAN. (2) If the measured backhaul downlink rate on WLAN is less than 1 megabit per second, then route YOUTUBE® traffic to the cellular network. (3) If the OPI received from base station is less than 3, then route YOUTUBE® traffic to the cellular network.

For example, assume that the traffic-steering module 222 finds the following rule in the traffic-steering rules 224: "If the measured RSRP is less than −90 decibel-milliwatts, then route TCP port 80 traffic to the WLAN." Upon reading this rule (assuming that the rule is valid—i.e., the measured RSRP is, in fact, less than −90 decibel-milliwatts), the traffic-steering module 222 configures the communication stack 220 to route all TCP connections that are meant to go to port 80 to instead go to port 8080 and address 127.0.0.1 (i.e., to the local socket used by the traffic-steering module 222). Thus, the traffic-steering module 222 can intercept TCP connections requested by the application program 214 and can proxy these requests to remote servers. Put differently, the traffic-steering module 222, which operates between the application program 214 and the remote host 110, can transfer ongoing sessions between different RANs (which use different RATs) in a way that is transparent to the application program 214.

Figure 3:
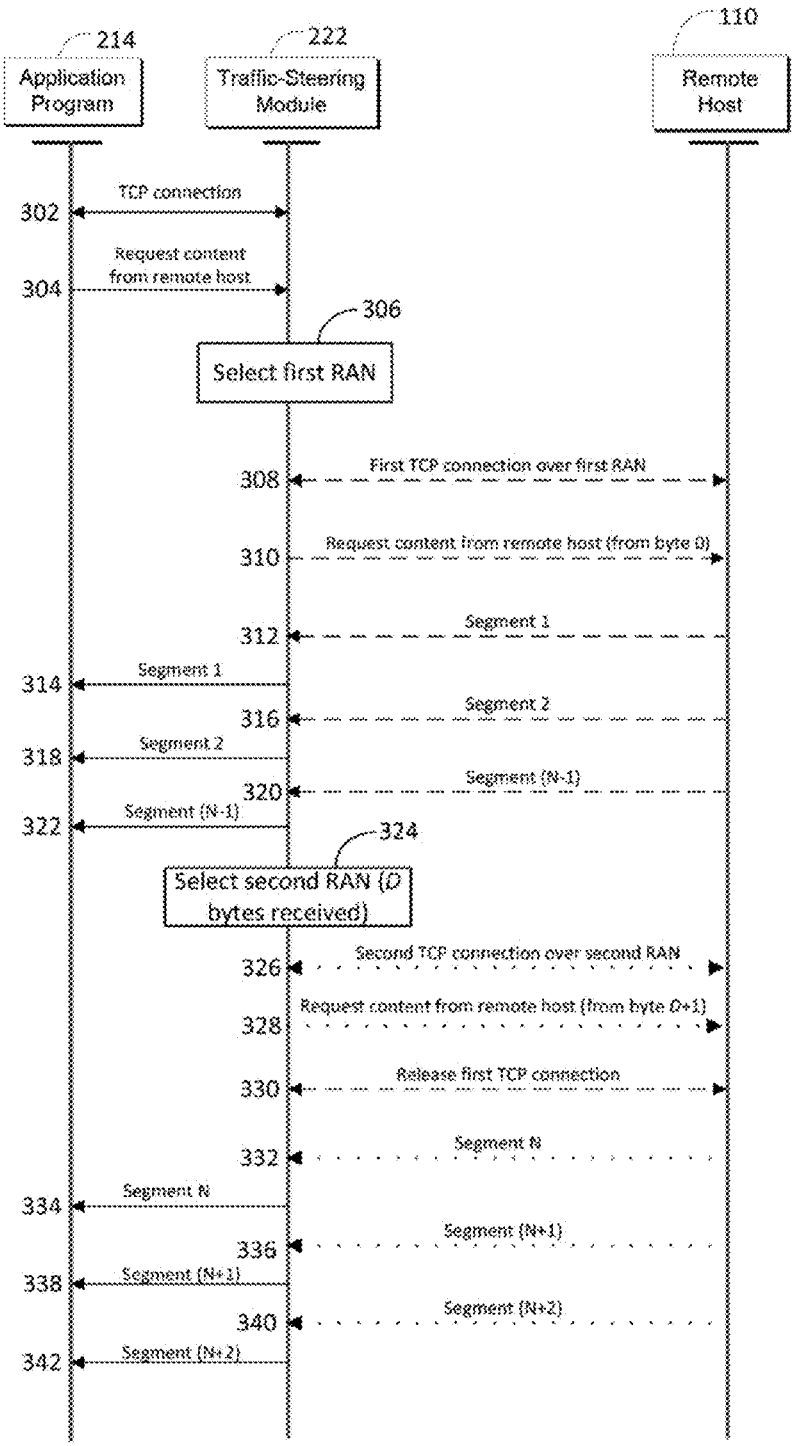
FIG. 3 is a message-flow diagram showing the interaction between an application program, a traffic-steering module, and a remote host.

FIG. 3 is a message-flow diagram showing how the device 100 transfers a data communication session. It begins when the application program 214 (e.g., a YOUTUBE® application) attempts to download online content data stored in the remote host 110. For this purpose, the application program 214 attempts to create a TCP connection to the remote host 110 at 302. The communication stack 220, however, redirects the TCP connection to the traffic-steering module 222. To cause the communication stack 220 to operate this way, the traffic-steering module 222 configures the communication stack with specific rules that change the IP destination address and port. For example, the traffic-steering module 222 uses the command "iptables-t nat-A PREROUTING-p tcp--dport 80-j DNAT--to 127.0.0.1:8080" to configure the communication stack 220 to change the destination address of all TCP, port 80, packets to 127.0.0.1, port 8080. The traffic-steering module 222 uses similar commands to redirect only TCP packets of specific application programs. Note that this redirection is transparent to the application program 214.

At 304, after the TCP connection between the application program 214 and traffic-steering module 222 has been established, the application 214 sends a request for data content (e.g., a YOUTUBE® video) to the remote host 110, which the traffic-steering module 222 receives. In an embodiment, this request takes the form of a hypertext transport protocol ("HTTP") GET request, which includes the uniform resource identifier ("URI") of the data content and the address of the remote host 110 (in the "Host" header). Note that other protocols besides HTTP can be used, such as a file transfer protocol.

At 306, the traffic-steering module 222 determines, based on the traffic-steering rules 224 and one or more of the radio-access conditions (retrieved from the data structure 223), the best RAN for retrieving the data content. The traffic-steering module 222 may also use a threshold value (retrieved from the data structure 223). In the example shown in FIG. 3, the most preferred access is the first RAN 102 (e.g., a cellular network), which the traffic-steering module 222 selects. Signaling over the first RAN 102 is shown with dashed lines.

At 308, the traffic-steering module 222 establishes a first TCP connection with the remote host 110 over the first RAN 102. At 310, the traffic-steering module 222 sends a data-content request to the remote server 110. The data-content request may be a copy of the data-content request received from the application 214 at 304. At 312, 316, and 320, the remote server 110 responds to the request by transmitting the requested data content to the device 100 as a sequence of segments. The traffic-steering module 222 receives each segment and forwards each segment to the application 214 at 314, 318, and 322. In this respect, the traffic-steering module 222 functions as a transparent proxy server that relays data between the application 214 and the remote host 110. In an embodiment, the traffic-steering module 222 stores the value of the overall size, M bytes, of the requested data content, which is provided by the remote host 110 (e.g., in the HTTP 200 OK response) as well as the value of the number of bytes delivered thus far to the application, D bytes.

At 324, the traffic-steering module 222 reads the traffic-steering rules 224 to determine if one or more of the rules are valid. For example, assume that one of the traffic-steering rules 224 is "If the measured RSRP is less than the low RSRP threshold, then route YOUTUBE® traffic to WLAN." The traffic-steering module 222 intermittently compares the measured RSRP to the low RSRP threshold, the values of which are provided by the access-evaluation module 221. Further assume that the traffic-steering module 222 finds the condition "measured RSRP is less than low RSRP threshold" to be true for a pre-determined length of time. The traffic-steering module therefore considers the rule to be valid and then needs to determine whether the matching data communication session (i.e., the YOUTUBE® stream) is transferrable.

The traffic-steering module 222 uses the stored values for M and D to decide whether the data communication session of the ongoing data-content retrieval (e.g., the YOUTUBE® video currently being streamed) is transferable to a different RAN. If the traffic-steering module 222 determines that the remaining data content to be retrieved (i.e., M minus D) is very small (e.g., below a predetermined threshold amount), or if the remaining data content can be retrieved in a very short period over the currently used RAN (e.g., less than a predetermined threshold period of time), then the traffic-steering module 222 marks the data communication session (i.e., the ongoing data-content retrieval) as "non transferrable." Otherwise, the traffic-steering module 222 marks the data communication session as "transferrable." For this example, assume that the traffic-steering module determines that the data communication session is transferable, selects the second RAN 104 as the best RAN for the data communication session, and determines that the data communication session is to be transferred to the second RAN 104.

At 326, after making the decision to transfer the data communication session from the first RAN 102 to the second RAN 104, the traffic-steering module 222 establishes a second TCP connection to the remote server 110 over the second RAN 104 (signaling on the second RAN 104 is shown with dotted lines). At 328, the traffic-steering module 222 sends a data-content retrieval request to the remote server 110 over the second TCP connection. In an embodiment, the request includes the same URI that the request at 310 contained, but also indicates, however, that the retrieval should start from byte D+1 (recall that the application 214 already received D bytes). In this example, assume that the traffic-steering module 222 includes the following header in an HTTP request message: "Range: bytes=152341-," where D=152340. At 330, the traffic-steering module 222 releases the first TCP connection to the remote server 110 (i.e., releases the connection over the first RAN 102). At 332, 336, and 340, the remote server 110 responds to the request by transmitting the requested data content to the device 100 as a sequence of segments. The traffic-steering module 222 receives each segment and forwards each segment to the application 214 at 334, 338, and 342. Note that the traffic-steering module 222 may release the first TCP connection (shown at 330) in parallel with receiving and forwarding the segments.

Figure 4A:
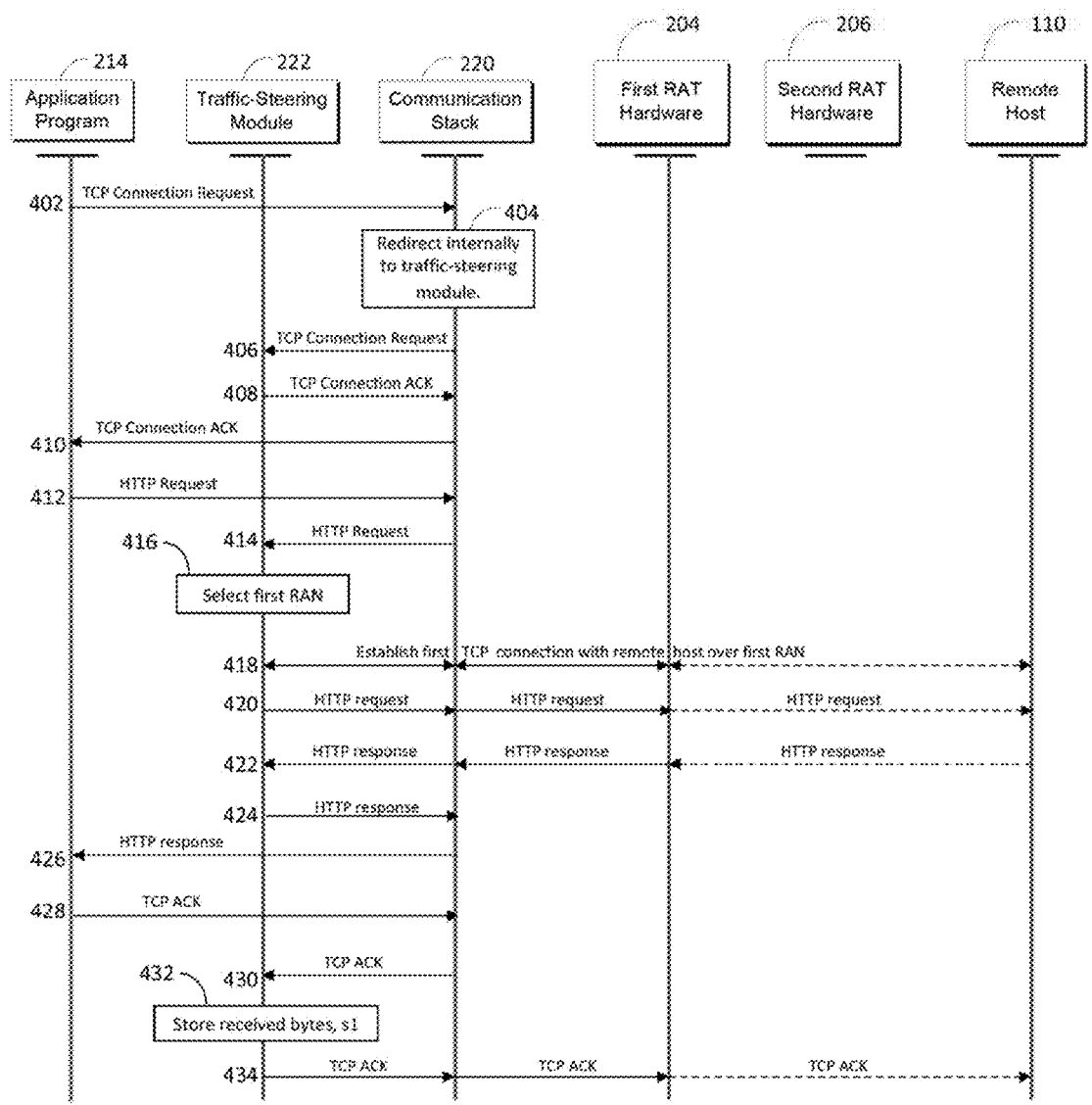
FIG. 4A is the first of two parts of a message-flow diagram showing the interaction between an application program, a traffic-steering module, a communication stack, a first radio-access technology ("RAT") hardware unit, a second RAT hardware unit, and a remote host.

FIG. 4A is a message-flow diagram showing another example of how the device 100 transfers a data communication session. It begins at 402, at which the application program 214 sends a TCP connection request to the communication stack 220. At 404, the communication stack 220 redirects the TCP connection request to the traffic-steering module 222. The traffic-steering module 222 receives the request at 406. At 408, the traffic-steering module 222 ACKs the TCP connection request. The communication stack 220 forwards the ACK to the application program 214 at 410. Note that, for simplicity, not all TCP messages are shown in FIG. 4A. For example, the typical 3-way handshake required to set up a TCP connection is shown as a 2-way handshake: TCP connection request and TCP connection ACK. At 412, the application program 214 sends an HTTP request message, which is intended for the remote host 110. The HTTP request message includes the URI of the desired data content. The communication stack 220 forwards the request to the traffic-steering module 222 at 414. At 416, the traffic-steering module 222 finds a valid traffic-steering rule for this HTTP session and, pursuant to that rule, selects the first RAN 102. At 418, the traffic-steering module 222 interacts with the first RAT hardware 204 to establish a first TCP connection with the remote host 110 over the first RAN 102. Signaling over the first RAN 102 is indicated by the dashed lines. The traffic-steering module 222 interacts with the first RAT hardware 204 to transmit the application program 214's HTTP connection request (from 412) to the remote host 110 over the first RAN 102 at 420 and to receive the HTTP response at 422. The HTTP response includes the first segment of the requested data content which, in this example, includes byte 0 through byte s1.

At 424, the traffic-steering module 222 sends the HTTP response to the communication module 220, which sends the HTTP response to the application program 214 at 426. In response, at 428, the application program 214 sends a TCP ACK to the communication stack 220, which sends the TCP ACK to the traffic-steering module 222 at 430. At 432, the traffic control module 222 stores the value of the received number of bytes, which is s1. At 434, the traffic-steering module 222 interacts with the first RAT hardware 204 to forward the application program 214's TCP ACK to the remote host 110.

Figure 4B:
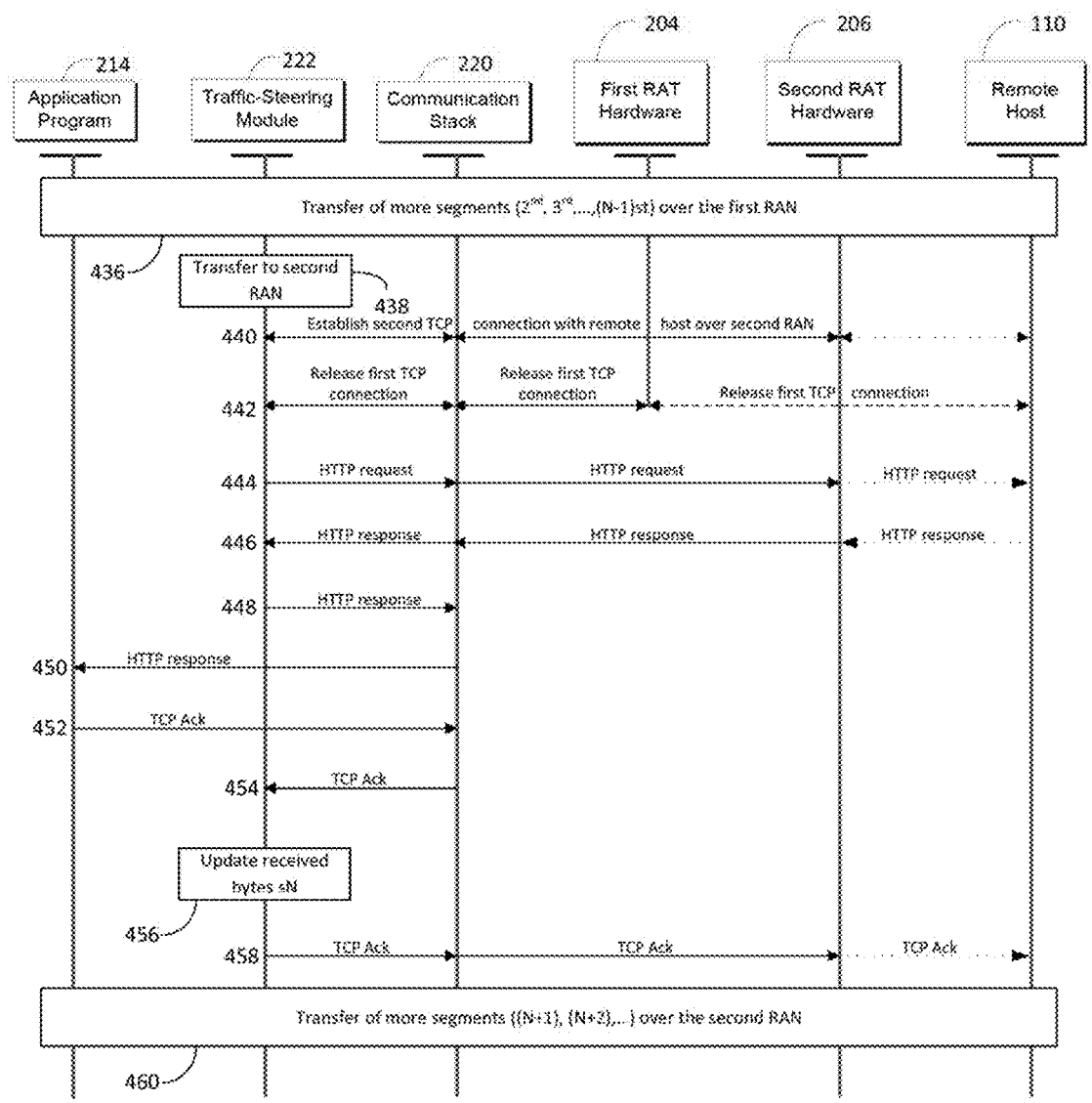
FIG. 4B is the second of the two parts of the message-flow diagram.

Continuing with the example, and turning to FIG. 4B, at 436, the remote server 110 responds to the HTTP request by transmitting the requested content to the device 100 as a sequence of segments, including the 2nd, 3rd, . . . , (N−1)th. The traffic-steering module 222 receives each segment and forwards each segment to the application program 214. Also, the traffic-steering module 222 updates the value of the received number of bytes (s2, s3, . . . , s(N−1)) after a segment is successfully delivered to the application program 214. The current value of the received number of bytes is denoted as D (see also 324). At 438, the traffic-steering module 222 elects, based on the traffic-steering rules 224 and a radio-access condition (possibly in comparison to a threshold), to transfer the data communication session to the second RAN 104. At 440, the traffic-steering module 222 establishes a second TCP connection with the second RAN 104 via the communication stack 220 and the second RAT hardware 206. Signaling over the second RAN 104 is indicated by the dotted lines. At 442 (or in parallel with other actions, such as 440), the traffic-steering module 222 releases the first TCP connection to the remote server 110 (i.e., releases the connection over the first RAN 102).

At 444, the traffic-steering module 222 interacts with the second RAT hardware 206 to transmit an HTTP request message (e.g., an HTTP GET message) to the remote host 110 over the second RAN 104. This HTTP request message includes, again, the URI of the desired data content but indicates to the remote server 110 that content should be sent starting from byte D+1 (not from the beginning), i.e., right after the last byte that has been successfully delivered to the application program 214. Note that in the example shown in FIG. 4B the last byte that has been successfully delivered to the application program 214 is s(N−1)=D. At 446, the traffic-steering module 222 interacts with the second RAT hardware 206 to receive the response to the HTTP request (from 444) over the second RAN 104. The HTTP response includes the Nth segment of the requested data content which, in this example, includes byte s(N−1) through byte sN. At 448, the traffic-steering module 222 sends the HTTP response to the communication stack 220, which sends the HTTP response to the application program 214 at 450. In response, at 452, the application program 214 sends a TCP ACK to the communication stack 220, which sends the TCP ACK to the traffic-steering module 222 at 454. At 456, the traffic-steering module 222 updates the received number of bytes received to the value sN. At 458, the traffic-steering module 222 interacts with the second RAT hardware 206 to forward the application program 214's TCP ACK to the remote host 110. At 460 the remote server 110 continues to respond to the HTTP request (from 444) by transmitting more content to the device 100 as a sequence of segments N+1, N+2, etc., over the second RAN 104. The traffic-steering module 222 receives each segment and forwards each segment to the application 214.

Figure 5:
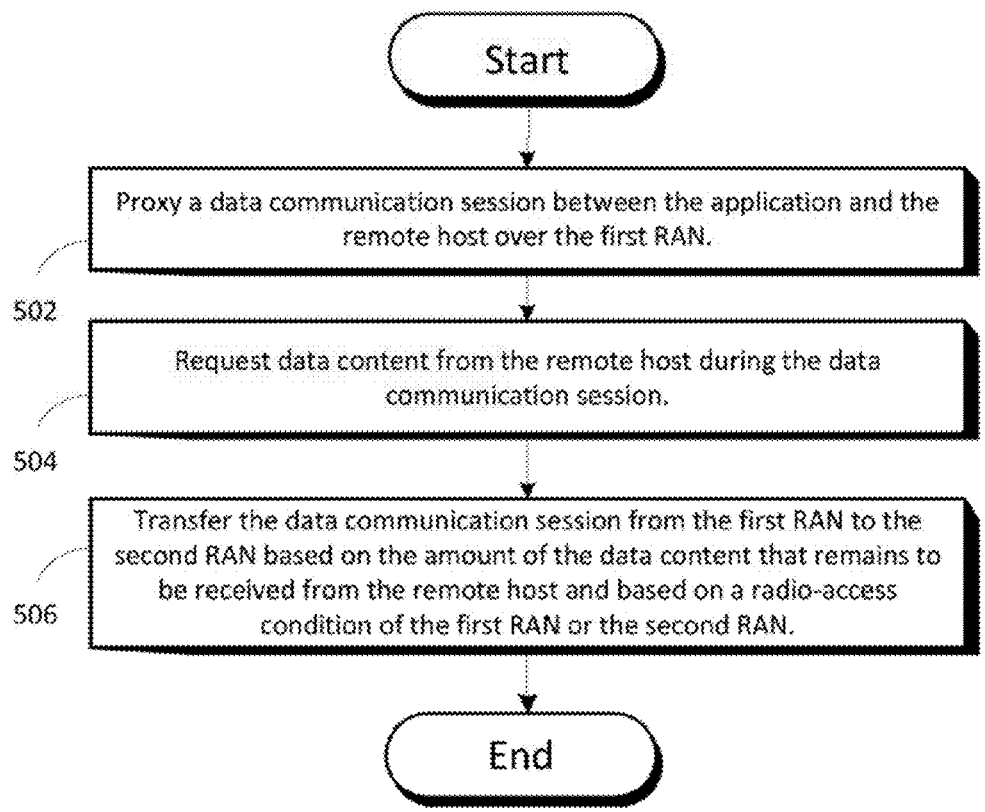
FIG. 5 and FIG. 6 are flowcharts depicting methods for switching between RATs.

Turning to FIG. 5, a flowchart illustrates steps carried out by the device 100 in an embodiment of the disclosure. At step 502, the device 100 proxies a data communication session between the application 214 and the remote host 110 over the first RAN 102. At step 504, the device 100 requests data content from the remote host 110 during the data communication session. At step 506, the device 100 transfers the data communication session from the first RAN 102 to the second RAN 104 based on the amount of the data content that remains to be received from the remote host 110 and based on a radio-access condition of the first RAN 102 or of the second RAN 104.

Figure 6:
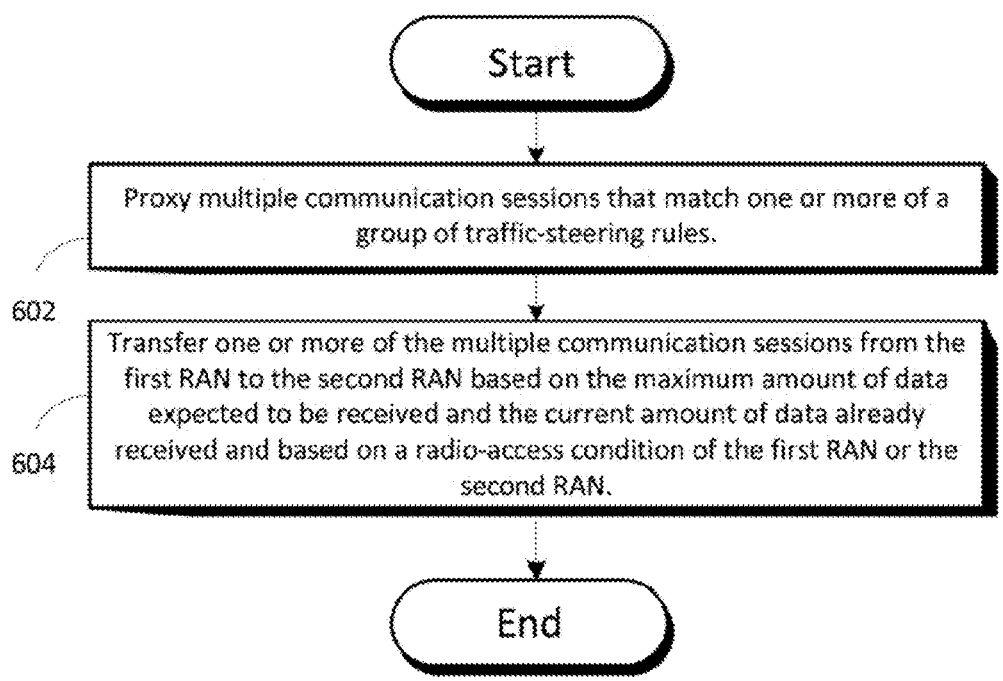

Turning to FIG. 6, a flowchart illustrates steps carried out by the device 100 in another embodiment of the disclosure. At step 602, the device 100 proxies multiple communication sessions that match one or more of a group of traffic-steering rules. At step 604, the device 100 transfers one or more of the multiple communication sessions from the first RAN 102 to the second RAN 104 based on the maximum amount of data expected to be received and the current amount of data already received and based on a radio-access condition of the first RAN 102 or of the second RAN 104.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. On a wireless device capable of communicating over a first radio-access network ("RAN") using a first radio-access technology ("RAT") and over a second RAN using a second RAT, a method for transferring a data communication session, the method comprising:
   proxying a data communication session between an application executing on the wireless device and a remote host over the first RAN;
   requesting data content from the remote host during the data communication session;
   determining an amount of data content that remains to be received from the remote host during the data communication session; and
   transferring the data communication session from the first RAN to the second RAN based on the determined amount of data content that remains to be received from the remote host during the data communication session and based on a radio-access condition of the first RAN or of the second RAN.

2. The method of claim 1 wherein the radio-access condition is selected from the group consisting of: measured reference-signal receive power, measured reference-signal received quality, measured wireless local area network basic service set load, measured wireless local area network backhaul rate, measured transport control protocol throughput, and an offload preference.

3. The method of claim 1 further comprising:
   terminating a transport control protocol ("TCP") connection with the first RAN;
   establishing a TCP connection with the second RAN; and
   requesting a remaining portion of the data content from the remote host via the second RAN.

4. The method of claim 1 further comprising:
   comparing the radio-access condition to a threshold;
   wherein transferring the data communication session from the first RAN to the second RAN comprises transferring the data communication session from the first RAN to the second RAN based on the comparison between the radio-access condition and the threshold.

5. The method of claim 1 wherein transferring the data communication session from the first RAN to the second RAN comprises transferring the data communication session from the first RAN to the second RAN if the amount of data that remain to be received is less than a predetermined amount.

6. The method of claim 1 wherein transferring the data communication session from the first RAN to the second RAN comprises transferring the data communication session from the first RAN to the second RAN if the amount of time that it would take to retrieve data that remain to be retrieved over the first RAN is less than a predetermined amount.

7. The method of claim 1 wherein proxying a data communication session comprises proxying the data communication session based on a valid traffic-steering rule, the method further comprising proxying additional data communication sessions for which the traffic-steering rule is valid.

8. The method of claim 1 wherein proxying a data communication session comprises proxying hypertext transport protocol requests and responses.

9. The method of claim 1 wherein proxying a data communication session comprises proxying the data communication session in a manner that is internal to the wireless device.

10. On a wireless device capable of communicating over a first radio-access network ("RAN") using a first radio-access technology ("RAT") and over a second RAN using a second RAT, a method for transferring a data communication session, the method comprising:
    proxying a plurality of communication sessions that match one or more of a group of traffic-steering rules;
    determining a maximum amount of data expected to be received and the current amount of data already received during a communication session of the plurality of communication sessions; and
    transferring the communication session of the plurality of communication sessions from a first RAN to the second RAN based on the determined maximum amount of data expected to be received and the current amount of data already received and based on a radio-access condition of the first RAN or of the second RAN.

11. The method of claim 10 further comprising:
    prior to transferring the communication session, receiving a first portion of requested data content over the first RAN; and
    after transferring the communication session, requesting a second portion of the data over the second RAN, the second portion beginning where the first portion ended.

12. The method of claim 10 further comprising:
    prior to transferring the communication session, terminating the communication session on the first RAN; and
    re-establishing the communication session on the second RAN.

13. An apparatus comprising:
    first radio-access technology ("RAT") hardware configured to communicate over a first radio-access network ("RAN");
    second RAT hardware configured to communicate over a second RAN; and
    a processor configured to:
        interact with the first RAT hardware and the second RAT hardware to intermittently determine a plurality of radio-access conditions for the first RAN and for the second RAN;
        proxy communication sessions that match one or more of a plurality of traffic-steering rules;
        for each proxied communication session, determine the maximum amount of data expected to be received and the current amount of data already received;
        determine, based on the determined maximum amount of data expected to be received and the current amount of data already received, which of the proxied communication sessions are transferrable from the first RAN to the second RAN or from the second RAN to the first RAN;
        for each proxied communication session that is determined to be transferable, decide, based on the plurality of traffic-steering rules and a radio-access condition, when the proxied communication session is to be transferred;
        for each proxied communication session that is to be transferred, terminate the communication session over the current RAN; and
        re-establish the communication session over the new access and request content retrieval starting from the current amount of data of the communication session.

14. The apparatus of claim 13 wherein the radio-access condition is selected from the group consisting of: measured reference-signal receive power, measured reference-signal received quality, measured wireless local area network basic service set load, measured wireless local area network backhaul rate, measured transport control protocol throughput, and an offload preference.

15. The apparatus of claim 13 wherein the processor is further configured to:
    interact with the first RAT hardware to terminate a transport control protocol ("TCP") connection with the first RAN; and
    establish a TCP connection with the second RAN.

16. The apparatus of claim 13 wherein the processor is further configured to:
    compare the radio-access condition to a threshold, and
    transfer the data communication session from the first RAN to the second RAN based on the comparison between the radio-access condition and the threshold.

17. The apparatus of claim 13 wherein the processor is further configured to determine which of the proxied communication sessions are transferrable from the first RAN to the second RAN or from the second RAN to the first RAN additionally based on whether the amount of time that it would take to retrieve data that remain to be retrieved over the first RAN is less than a predetermined amount.

* * * * *